United States Patent
Watanabe

(10) Patent No.: US 11,589,409 B2
(45) Date of Patent: Feb. 21, 2023

(54) COMMUNICATION APPARATUS AND CONTROL METHOD

(71) Applicant: CANON KABUSHIKI KAISHA, Tokyo (JP)

(72) Inventor: Tokiko Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 16/522,462

(22) Filed: Jul. 25, 2019

(65) Prior Publication Data

US 2020/0045763 A1    Feb. 6, 2020

(30) Foreign Application Priority Data

Jul. 31, 2018  (JP) .............................. JP2018-143287

(51) Int. Cl.
*H04W 76/16* (2018.01)
*G06F 3/12* (2006.01)
*H04W 76/19* (2018.01)

(52) U.S. Cl.
CPC .......... *H04W 76/16* (2018.02); *G06F 3/1204* (2013.01); *G06F 3/1231* (2013.01); *G06F 3/1236* (2013.01); *G06F 3/1292* (2013.01); *H04W 76/19* (2018.02)

(58) Field of Classification Search
CPC ....... H04W 76/16; H04W 76/19; H04W 4/80; H04W 4/70; H04W 76/14; H04W 76/15; G06F 3/1204; G06F 3/1231; G06F 3/1236; G06F 3/1292; H04L 41/0883; H04L 41/0886; H04L 41/0806

See application file for complete search history.

(56) References Cited

U.S. PATENT DOCUMENTS

| | | | | |
|---|---|---|---|---|
| 8,554,970 | B2* | 10/2013 | Suumaki | H04W 4/08 |
| | | | | 710/303 |
| 9,288,228 | B2* | 3/2016 | Suumäki | H04L 63/18 |
| 10,244,563 | B2* | 3/2019 | Sumiuchi | H04W 4/20 |
| 10,979,581 | B2* | 4/2021 | Okamoto | G06F 3/1207 |
| 2013/0260819 | A1 | 10/2013 | Suzuki | |
| 2015/0189023 | A1* | 7/2015 | Kubota | H04W 76/14 |
| | | | | 455/7 |
| 2017/0289393 | A1 | 10/2017 | Yokoyama | |
| 2018/0146113 | A1* | 5/2018 | Takahashi | H04N 1/00307 |
| 2019/0050175 | A1* | 2/2019 | Moriya | G06F 3/1254 |
| 2019/0349449 | A1* | 11/2019 | Shribman | H04L 67/06 |

(Continued)

FOREIGN PATENT DOCUMENTS

| | | |
|---|---|---|
| CN | 103369454 A | 10/2013 |
| CN | 105191172 A | 12/2015 |

(Continued)

*Primary Examiner* — Christopher P Grey

(74) *Attorney, Agent, or Firm* — Canon U.S.A., Inc., IP Division

(57) ABSTRACT

A communication apparatus includes a control unit that causes the communication apparatus to operate, based on that a predetermined command is received through a second connection in a first exclusive state in which the communication apparatus does not receive connection information through a first connection or a second exclusive state in which the communication apparatus is not connected to an external device corresponding to the connection information that is received through the first connection.

20 Claims, 8 Drawing Sheets

(56) References Cited

U.S. PATENT DOCUMENTS

2021/0326090 A1* 10/2021 Sugawara ............. G06F 3/1236
2022/0043100 A1*  2/2022 Sanji ................... H01Q 9/0421

FOREIGN PATENT DOCUMENTS

| | | |
|---|---|---|
| CN | 105227801 A | 1/2016 |
| CN | 105847317 A | 8/2016 |
| CN | 105848191 A | 8/2016 |
| CN | 107025083 A | 8/2017 |
| EP | 3209065 A2 | 8/2017 |
| IN | 201647028144 A | 9/2016 |
| JP | 2007-048211 A | 2/2007 |
| JP | 2015154131 A | 8/2015 |
| JP | 2016004508 A | 1/2016 |
| JP | 2016036190 A | 3/2016 |
| JP | 2017-212500 A | 11/2017 |
| JP | 2018030295 A | 3/2018 |

* cited by examiner

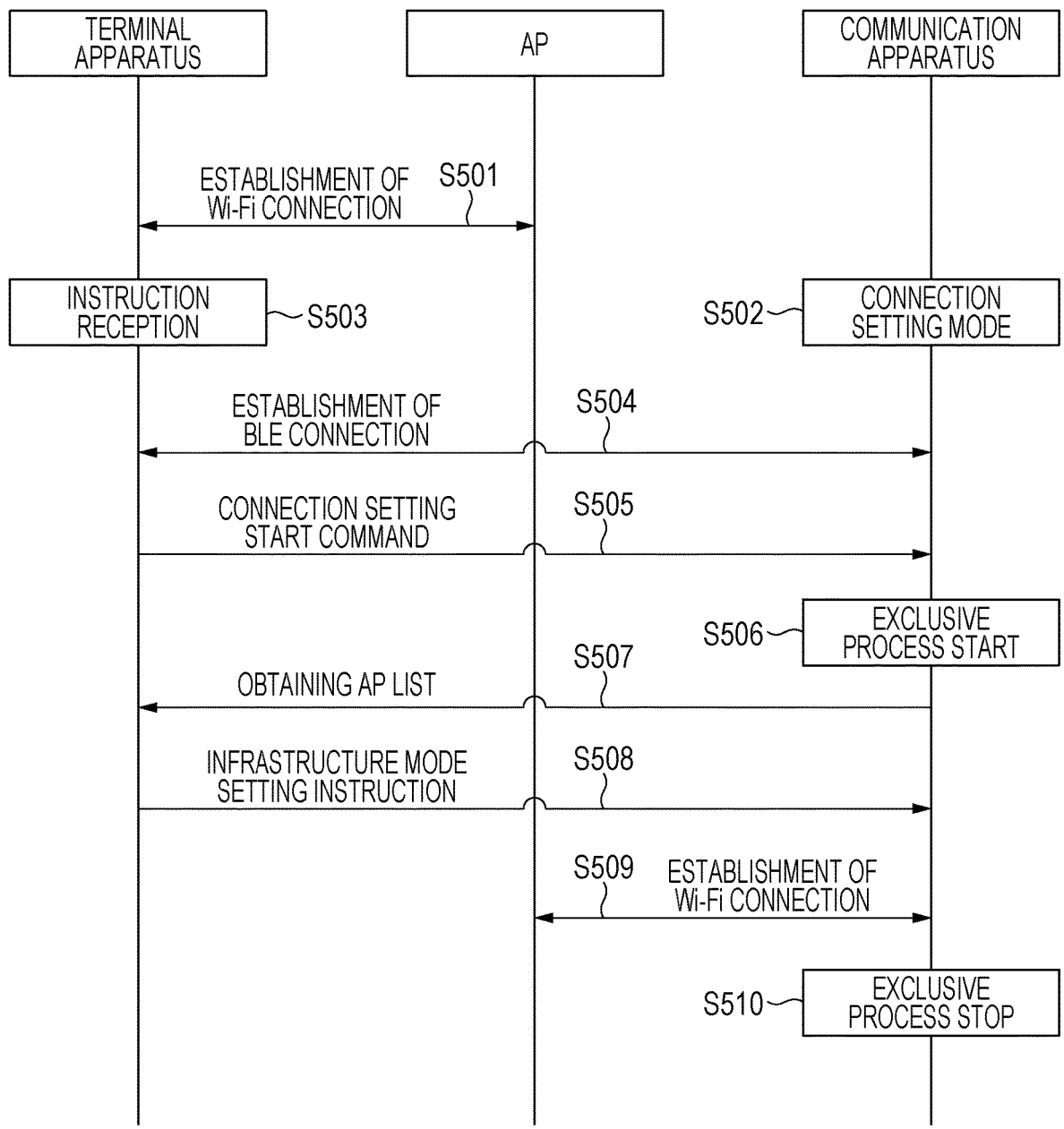

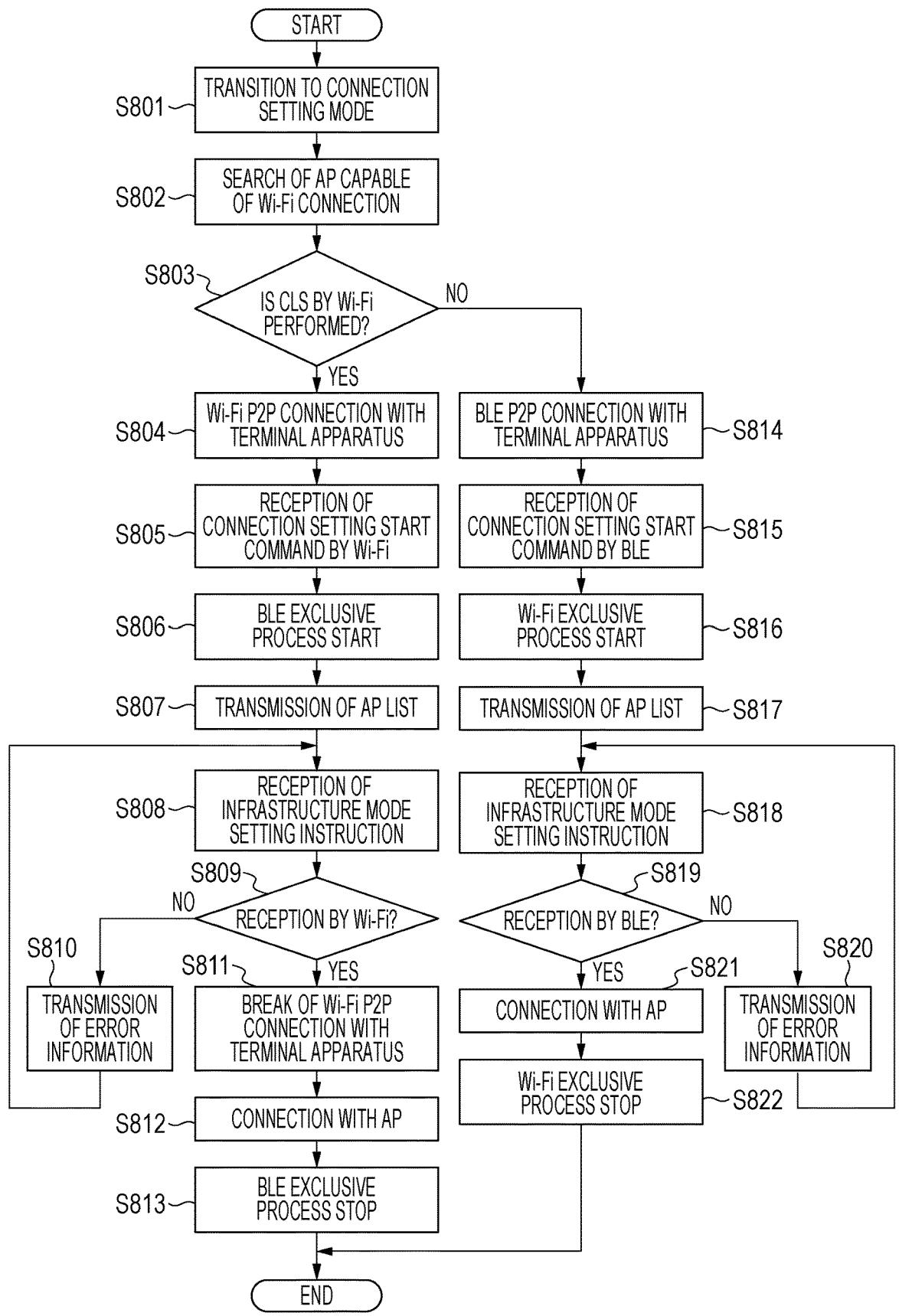

COMMUNICATION APPARATUS AND CONTROL METHOD

BACKGROUND OF THE INVENTION

Field of the Invention

The present invention relates to a communication apparatus and a control method.

Description of the Related Art

An information-processing apparatus such as a smart phone and a communication apparatus such as a printer that supports a network are connected to each other by a communication method such as wireless LAN communication via an external device such as a wireless LAN router. This connection method is referred to as an infrastructure connection. For example, establishment of the infrastructure connection enables bi-directional communication between the information-processing apparatus and the communication apparatus and enables a service on the internet to be used through connection with the interact. In a known aspect to establish the connection between the information-processing apparatus and the communication apparatus, the information-processing apparatus (e.g. smart phone) transmits connection information for connection with the external device (e.g. wireless LAN router) to the communication apparatus (e.g. printer), and the communication apparatus applies connection settings for the connection with the external device on the basis of the connection information.

Japanese Patent Laid-Open No. 2007-048211 discloses an information-processing apparatus that obtains a list of access points to which a communication apparatus can be connected from the communication apparatus, transmits information about an access point that is selected from the list by a user to the communication apparatus, and is connected to the communication apparatus with the access point interposed therebetween.

In recent years, there is a tendency that communication between apparatuses is increasingly used, and there is a growing desire for appropriately performing a process of establishing connection between a communication apparatus and an external device by using communication of connection information.

The present invention provides appropriate performance of a process of establishing connection between a communication apparatus and an external device by using communication of connection information.

SUMMARY OF THE INVENTION

The present invention provides a communication apparatus that is operable in a state that the communication apparatus simultaneously maintains a first connection with a first terminal apparatus by using a first communication method and a second connection with a second terminal apparatus by using a second communication method having a higher communication speed than that of the first communication method. The communication apparatus includes a first reception unit configured to receive, through the first connection, connection information for connection with an external device that is external to the communication apparatus, the first terminal apparatus, and the second terminal apparatus, a second reception unit configured to receive, through the second connection, the connection information for connection with the external device, a connection unit configured to establish, when the connection information is received through the first connection, a connection between the communication apparatus and the external device corresponding to the connection information received through the first connection and configured to establish, when the connection information is received through the second connection, a connection between the communication apparatus and the external device corresponding to the connection information that is received through the second connection, and a control unit that is configured to control the communication apparatus to operate, based on that a predetermined command is received through the second connection, in a first exclusive state in which the communication apparatus does not receive the connection information through the first connection or a second exclusive state in which the communication apparatus is not connected to the external device corresponding to the connection information that is received through the first connection. The first connection is maintained after the connection between the communication apparatus and the external device corresponding to the connection information that is received through the second connection is established based on that the connection information is received through the second connection in a state in which the first connection and the second connection are simultaneously maintained.

Further features of the present invention will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

BRIEF DESCRIPTION OF THE DRAWINGS

FIG. 5 illustrates an example of a sequence diagram of the connection setting process that is performed by the communication system according to the embodiment of the present invention.

FIG. 8 is a flowchart illustrating a connection setting process that is performed by the communication apparatus according to the embodiment of the present invention.

DESCRIPTION OF THE EMBODIMENTS

A preferred embodiment of the present invention will hereinafter be described by way of example with reference to the drawings. It should be understood that modifications and alterations that are appropriately made to the embodiment described below on the basis of general knowledge of a person skilled in the art without departing from the spirit of the present invention are included in the range of the present invention.

An information-processing apparatus and a communication apparatus that are included in a communication system according to the present embodiment will be described. According to the present embodiment, a smart phone will be described as an example of the information-processing apparatus. The information-processing apparatus, however, is not limited thereto, and various apparatuses such as a mobile terminal, a note PC, a tablet terminal, a PDA (Personal Digital Assistant), or a digital camera can be applied. According to the present embodiment, a printer will be described as an example of the communication apparatus. The communication apparatus, however, is not limited thereto, and various apparatuses can be applied provided that the apparatuses are capable of having wireless communication with the information-processing apparatus. For example, the printer can be an inkjet printer, a full color laser beam printer, or a monochrome printer. In addition to the printer, a copying machine, a facsimile machine, a mobile terminal, a smart phone, a note PC, a tablet terminal, a PDA, a digital camera, a music playback device, a television, and a smart speaker can also be acceptable. Other than these, a multifunction peripheral that has plural functions such as a copy function, a FAX function, and a print function can also be acceptable.

Figure 1:
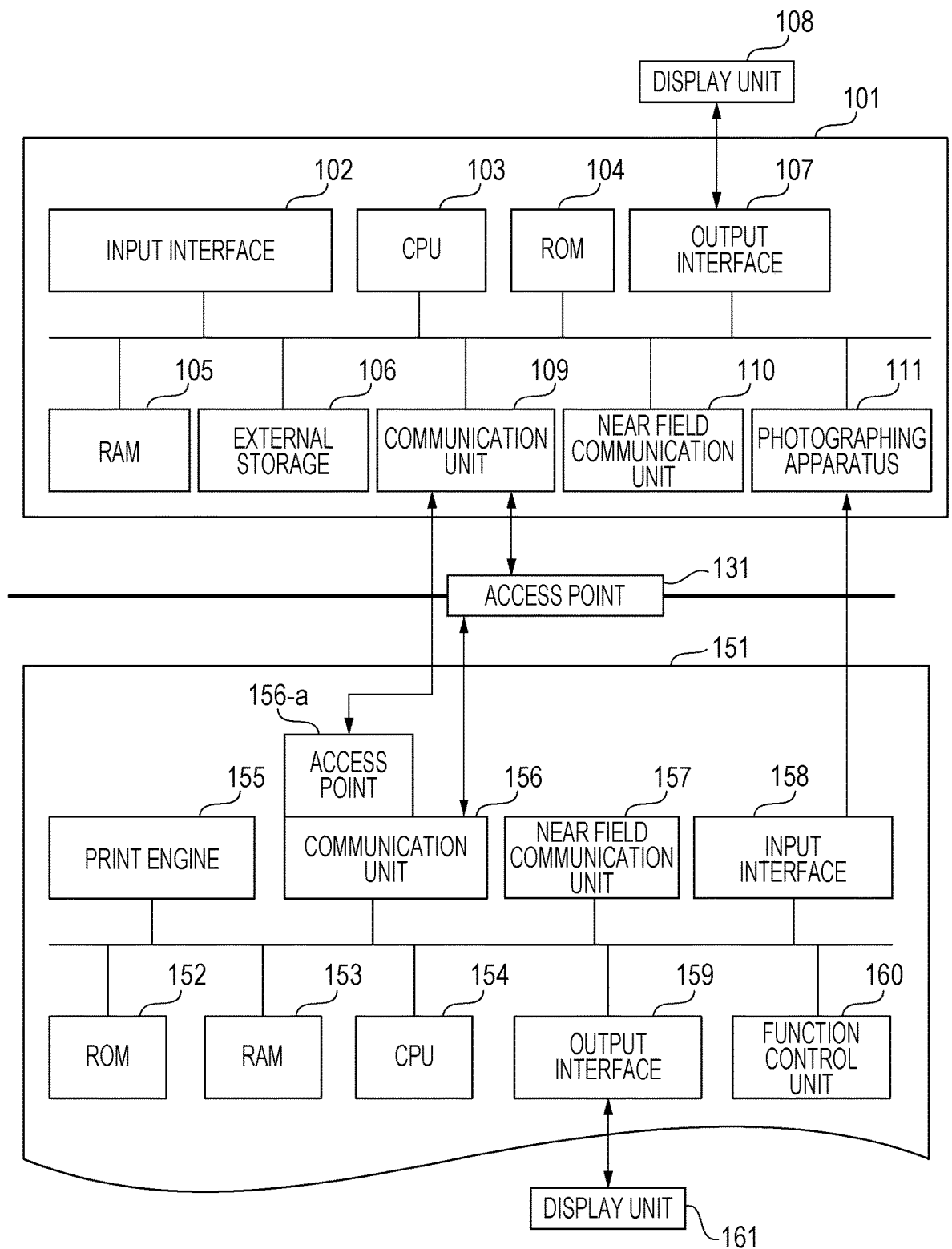
FIG. 1 illustrates an example of the structure of an information-processing apparatus and a communication apparatus according to an embodiment of the present invention.

The structure of the communication apparatus that can communicate with the information-processing apparatus according to the present embodiment, and the information-processing apparatus according to the present embodiment will now be described with reference to a block diagram in FIG. 1. According to the present embodiment, the structure will be described by way of example. The present embodiment can be applied to an apparatus that can communicate with the communication apparatus, and the function thereof is not limited particularly to that in the figure.

A terminal apparatus 101 is the information-processing apparatus according to the present embodiment. The terminal apparatus 101 includes, for example, an input interface 102, a CPU 103, a ROM 104, a RAM 105, an external storage 106, an output interface 107, a display unit 108, a communication unit 109, a near field communication unit 110, and a photographing apparatus 111. The terminal apparatus 101 is supposed to be a device such as a smart phone but is not limited to a smart phone.

The input interface 102 receives input data and an operation instruction from a user and includes, for example, a physical keyboard, a button, and a touch panel. The input interface 102 may have the same structure as the output interface 107 described later, and the same structure may be used to output a screen and receive a user operation.

The CPU 103 is a system control unit and controls the entire terminal apparatus 101.

The ROM 104 stores control programs that are performed by the CPU 103, a data table, and fixed data of, for example, an embedded operating system (referred to below as an OS) program. According to the present embodiment, the control programs that are stored in the ROM 104 control software execution such as scheduling, task switching, and interrupt processing under control of the embedded OS that is stored in the ROM 104.

The RAM 105 includes, for example, a SRAM (Static Random Access Memory) that needs a backup power supply. In the RAM 105, data is maintained with a primary battery for data backup, not illustrated, and important data such as program control variables can be stored therein without being volatilized. The RAM 105 has a memory area in which setting information of the terminal apparatus 101 and management data of the terminal apparatus 101, for example, are stored. The RAM 105 is also used as a main memory and a work memory of the CPU 103.

The external storage 106 includes an application (connection setting application described later) that provides a connection setting function. The external storage 106 also includes various programs such as a print information generation program that generates print information that can be interpreted by a communication apparatus 151 and an information transmission and reception control program that is transmitted to and received from the communication apparatus 151 that is connected by using the communication unit 109. In the external storage 106, various kinds of information used by the programs and image data that is obtained from another information-processing apparatus and the internet are saved.

The output interface 107 controls display of data and notification of a state of the terminal apparatus 101 that are carried out by the display unit 108.

The display unit 108 includes a LED (light-emitting diode) or a LCD (liquid-crystal display) and is used for display of the data and the notification of the state of the terminal apparatus 101. The display unit 108 may be provided with a software keyboard that includes keys such as a numeral input key, a mode setting key, a determination key, a cancel key, and a power supply key, and an input from the user may be received by using the display unit 108.

The communication unit 109 is connected to an apparatus such as the communication apparatus 151 and used for data communication. For example, the communication unit 109 may directly communicate with the communication apparatus 151 by wireless communication or may communicate therewith with an external access point (an access point 131 referred to below as an AP 131) that is outside the terminal apparatus 101 and the communication apparatus 151 interposed therebetween. The access point is a device that creates a network and that determines a communication channel that is used for communication in the created network. According to the present embodiment, the wireless communication method of the communication unit 109 is Wi-Fi (Wireless Fidelity) (registered trademark) but may be, for example, Bluetooth Classic (registered trademark). Examples of the AP 131 include a device such as a wireless LAN router. According to the present embodiment, a method of connecting the terminal apparatus 101 and the communication apparatus 151 directly to each other without the external access point interposing therebetween is referred to as a direct connection method. A method of connecting the terminal apparatus 101 and the communication apparatus 151 to each other with the external access point interposed therebetween is referred to as an infrastructure connection method.

The near field communication unit 110 is wirelessly connected to an apparatus such as the communication apparatus 151 in a close range, is used for data communication, and uses a communication method that differs from that in the communication unit 109 for the communication. The near field communication unit 110 can be connected to a near field communication unit 157 of the communication apparatus 151. According to the present embodiment, the communication method of the near field communication unit 110 is Bluetooth Low Energy (BLE) but may be another communication method such as Bluetooth Classic or Wi-Fi Aware.

According to the present embodiment, the communication speed of the communication method that is used by the communication unit 109 is higher than that of the communication method that is used by the near field communication unit 110. The near field communication unit 110 is used to exchange communication information for communication of the communication unit 109 with an apparatus such as the communication apparatus 151.

The photographing apparatus 111 converts an image that is photographed by a photographing element into digital data. The digital data is stored in the RAM 105 once. Subsequently, the digital data is converted into a predetermined image format by a program that is performed by the CPU 103 and saved as image data in the external storage 106.

The communication apparatus 151 is a communication apparatus according to the present embodiment. The communication apparatus 151 includes, for example, a ROM 152, a RAM 153, a CPU 154, a print engine 155, a communication unit 156, the near field communication unit 157, an input interface 158, an output interface 159, a function control unit 160, and a display unit 161.

The communication unit 156 is connected to an apparatus such as the terminal apparatus 101 and used for data communication. According to the present embodiment, the wireless communication method of the communication unit 156 is Wi-Fi but may be, for example, Bluetooth Classic. The communication unit 156 includes an access point 156-a for connection with the apparatus such as the terminal apparatus 101 inside the communication apparatus 151. The access point can be connected to the communication unit 109 of the terminal apparatus 101. The communication unit 156 may directly communicate with the terminal apparatus 101 by using the access point 156-a or may communicate with the terminal apparatus 101 with the AP 131 interposed therebetween. The access point 156-a may be hardware that functions as the access point, or the communication unit 156 may operate as the access point 156-a by using software that functions as the access point. The access point inside the communication apparatus 151 may include plural access points that have different SSIDs or passwords. According to the present embodiment, the access point inside the communication apparatus 151 includes at least an AP for connection setting described later.

The RAM 153 includes, for example, a DRAM that needs a backup power supply. In the RAM 153, data is maintained by supplying power for data backup not illustrated. Accordingly, important data such as program control variables can be stored without being volatilized. The RAM 153 is also used as a main memory and a work memory of the CPU 154, and provides a reception buffer for temporally saving print information that is received from, for example, the terminal apparatus 101, and various kinds of information is saved therein.

The ROM 152 stores control programs that are performed by the CPU 154, a data table, and fixed data such as an OS program. According to the present embodiment, the control programs that are stored in the ROM 152 control software execution such as scheduling, task switching, and interrupt processing under control of an embedded OS that is stored in the ROM 152. The ROM 152 also has a memory area in which data that is needed to be maintained even when no power is supplied such as setting information of the communication apparatus 151 and management data of the communication apparatus 151 is stored.

The CPU 154 is a system control unit and controls the entire communication apparatus 151.

The print engine 155 forms an image on a recording medium such as paper with a recording material such as ink on the basis of information that is saved in the RAM 153 or a print job that is received from, for example, the terminal apparatus 101 and outputs a print result. At this time, the print job that is transmitted from, for example, the terminal apparatus 101 has a large amount of transmission data and needs high-speed communication. Accordingly, the print job is received via the communication unit 156 that enables communication at a speed higher than that in the near field communication unit 157.

The near field communication unit 157 is wirelessly connected to an apparatus such as the terminal apparatus 101 in a close range. According to the present embodiment, the communication method of the near field communication unit 157 is BLE but may be another communication method such as Bluetooth Classic or Wi-Fi Aware.

The input interface 158 receives input data and an operation instruction from the user and includes, for example, a physical keyboard, a button, and a touch panel. The input interface 158 may have the same structure as the output interface 159 described below, and the same structure may be used to output a screen and receive a user operation. The output interface 159 controls display of data and notification of a state of the communication apparatus 151 that are carried out by the display unit 161.

The function control unit 160 manages functional operation of whether functions of the communication apparatus 151 are simultaneously performed.

The display unit 161 includes a LED (light-emitting diode) or a LCD (liquid-crystal display) and is used for display of the data and the notification of the state of the communication apparatus 151. The display unit 161 may be provided with a software keyboard that includes keys such as a numeral input key, a mode setting key, a determination key, a cancel key, and a power supply key, and an input from the user may be received by using the display unit 161.

BLE Communication

A process of transmitting advertisement information in accordance with a BLE standard and a process of receiving a start request of GATT (Generic Attribute Profile communication will now be described with reference to FIGS. 3. According to the present embodiment, the near field communication unit 157 operates as a slave device. Accordingly, the near field communication unit 157 performs the above processes.

Figure 3A:
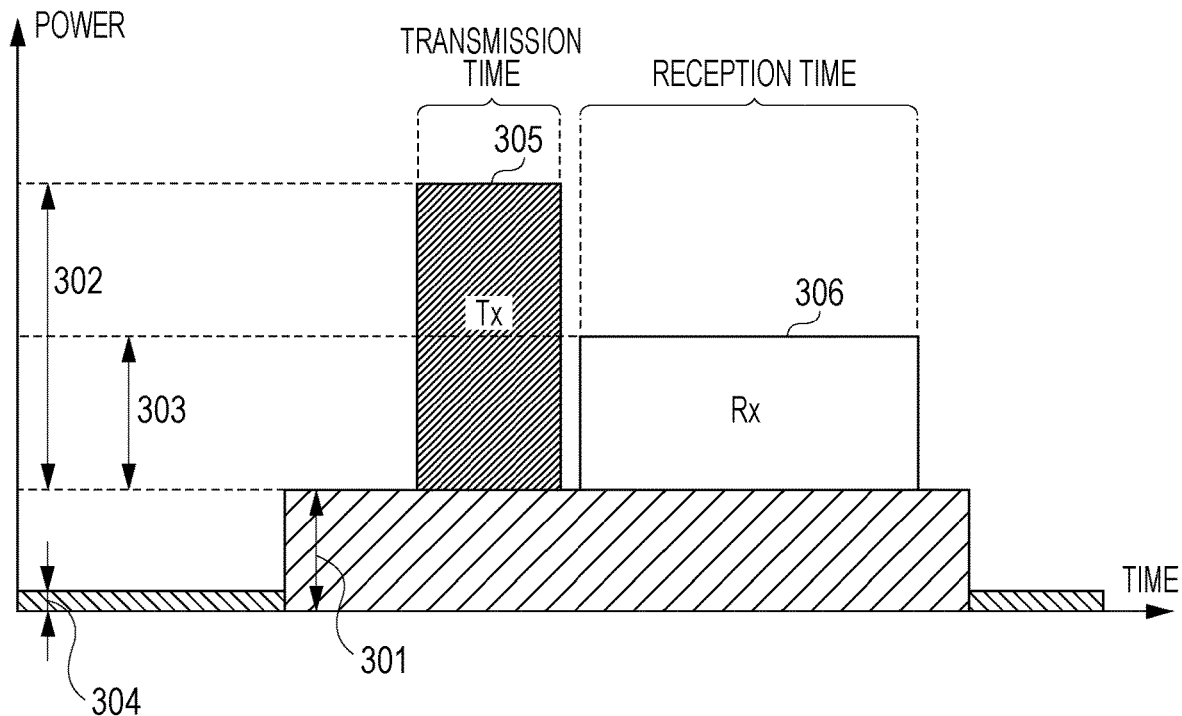
FIGS. 3A and 3B illustrate diagrams for description of BLE communication according to the embodiment of the present invention.

The near field communication unit 157 divides a frequency band of 2.4 GHz into 40 channels (0 to 39 ch) for communication. Among the channels, the near field communication unit 157 uses 37-th to 39-th channels for the transmission of the advertisement information and the start request of GATT communication and uses 0-th to 36-th channels for data communication after the BLE connection is established. In FIG. 3A, the vertical axis represents the power consumption of the near field communication unit 157, the horizontal axis represents time, and power consumption in each process when the advertisement information is transmitted by using one of the channels is illustrated. Tx 305 represents total power consumption in a transmission process of broadcasting the advertisement information. Rx 306 represents total power consumption in a reception process of activating a receiver that receives the start request of the GATT communication. The start request of the GATT communication is transmitted to the near field communication unit 157 by the near field communication unit 110 that receives the advertisement information.

Transmission power 302 represents instantaneous power consumption in the transmission process. Reception power 303 represents instantaneous power consumption in the reception process. Microcomputer operation power 301 represents instantaneous power consumption when a microcomputer of the near field communication unit 157 operates. The reason why the microcomputer operates before and after Tx 305 and Rx 306 is that the microcomputer needs to start up in advance to start and stop the transmission and reception processes. In the case where the advertisement information is transmitted by using plural channels, the power consumption increases by an amount depending on the number of the channels for the transmission of the advertisement information. Sleep power 304 represents instantaneous power consumption of the near field communication unit 157 in a state where the microcomputer does not operate and the near field communication unit 157 is in a power saving mode. The near field communication unit 157 thus performs the transmission process by using a predetermined channel, subsequently performs the reception process for a certain period of time by using the same channel, and waits until the start request of the GATT communication is transmitted from the near field communication unit 110. After the start request of the GATT communication is received from the near field communication unit 110, the near field communication unit 157 establishes BLE connection with the near field communication unit 110. This enables the GATT communication with the near field communication unit 110. BLE communication described later may be communication with the advertisement information or the GATT communication.

Figure 3B:
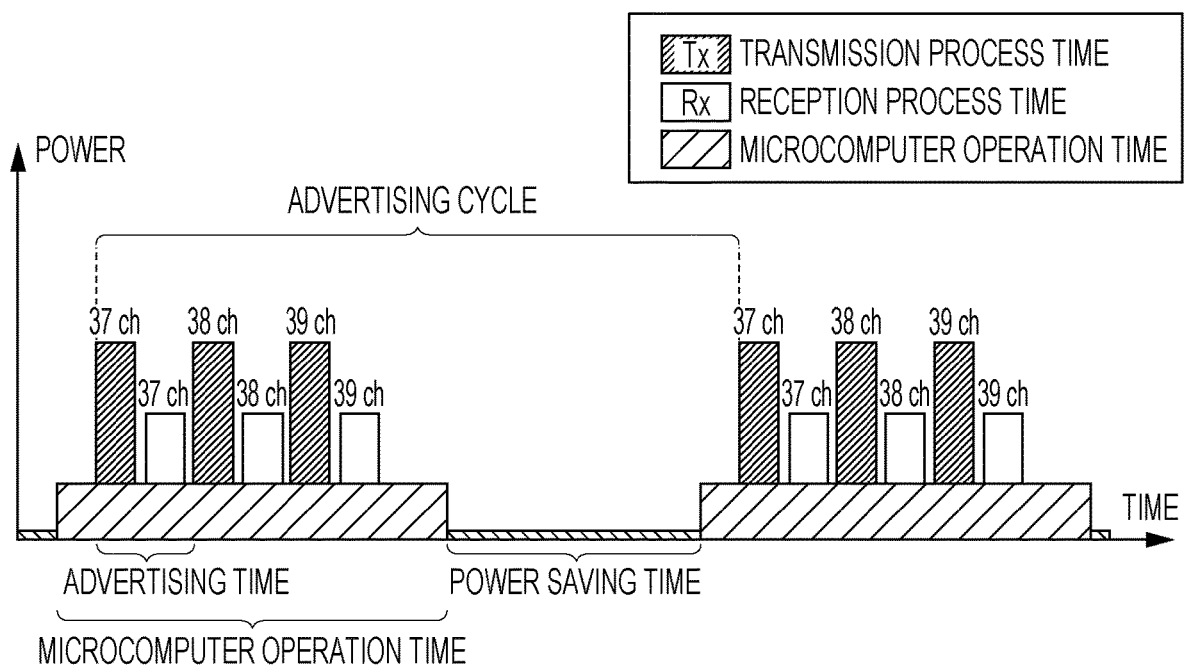

As illustrated in FIG. 3B, the near field communication unit 157 repeats the transmission process and reception process of the advertisement information three times every channel, subsequently stops operation of the microcomputer, and stays in the power saving mode for a certain period of time. A combination of the transmission process and reception process of the advertisement information by using the predetermined channel is referred to below as an advertisement. A time interval during which the advertisement information is transmitted by using the predetermined channel is referred to below as an advertising cycle. The number of times the advertisement is repeated up to the power saving mode after the first advertisement can be freely changed provided that the number of times is three or less.

According to the present embodiment, the near field communication unit 157 starts operating as the slave device of BLE based on that operation in a connection setting mode is started, a user operation to activate a BLE function is received, or the communication apparatus 151 is switched on.

Wi-Fi Communication (P2P Mode, or Peer to Peer Mode)

According to the present embodiment, the communication apparatus 151 operates in a P2P mode including a software AP mode and a Wi-Fi Direct (WFD) mode in order to establish connection (referred to below as P2P connection) by a P2P method during Wi-Fi communication. According to the present embodiment, the P2P connection means a wireless connection form in which apparatuses are directly connected to each other without the external device such as the AP 131 interposing therebetween. The communication apparatus 151 that operates in the P2P mode operates as a parent device in the network to which the communication apparatus 151 belongs. The P2P mode includes the WFD mode and the software AP mode described below.

WFD is a standard that is created by WiFi Alliance. The terminal apparatus 101 and the communication apparatus 151, which support WFD, can be wirelessly connected directly to each other by WFD without another access point interposing therebetween. In particular, the apparatus that supports WFD and that serves as the access point (master station, parent station) is referred to as a group owner. A mode in which P2P connection is made by WFD is referred to as the WFD mode.

The communication apparatus 151 has a software access point (software AP) function to operate as the access point. The communication apparatus 151 activates (starts up) a software AP in the communication apparatus 151. The terminal apparatus 101 is connected to the software AP by normal Wi-Fi other than WFD. The connection in this way enables the terminal apparatus 101 and the communication apparatus 151 to be wirelessly connected directly to each other without another access point interposing therebetween. A mode in which the software AP in the communication apparatus 151 is activated for operation to make P2P connection is referred to as the software AP mode. When the software AP mode stops, the communication apparatus 151 inactivates the software AP in the communication apparatus 151. This makes it impossible to make P2P connection with another apparatus by using the software AP.

In the P2P mode, the communication apparatus 151 operates as the parent device. Accordingly, the communication apparatus 151 can determine which communication channel is to be used for communication in the P2P mode. When the communication apparatus 151 operates, for example, in the infrastructure mode and the P2P mode at the same time, the communication channel that is used for communication in the infrastructure mode is also used for communication in the P2P mode by control thereof. For example, the communication channel that is used for connection between the communication apparatus 151 and the AP 131 may be preferentially selected more than another channel as the channel that is used for the communication in the P2P mode.

Connection information (the SSID and the password) for connection with the communication apparatus 151 in the P2P mode may be freely changed in response to, for example, a user operation into an operation unit of the communication apparatus 151.

Wi-Fi Communication (Infrastructure Mode)

According to the present embodiment, the communication apparatus 151 operates in the infrastructure mode in order to establish connection (referred to below as infrastructure connection) by an infrastructure method during Wi-Fi communication. According to the present embodiment, the infrastructure connection means a wireless connection form in which an external device that controls a network such as the AP 131 operates as the parent device and apparatuses are connected to each other with the parent device interposed therebetween. The communication apparatus 151 that operates in the infrastructure mode operates as a child device in the network to which the communication apparatus 151 belongs.

The infrastructure mode enables the communication apparatus 151 and the terminal apparatus 101 to be connected to each other with the AP 131 interposed therebetween and enables communication between the communication apparatus 151 and the terminal apparatus 101 with the AP 131 interposed therebetween. The channel that is used for communication in the infrastructure mode may be in a frequency band (such as a band of 5.0 Ghz) other than 2.4 Ghz.

In order for the terminal apparatus 101 to communicate with the communication apparatus 151 with the AP 131 interposed therebetween, it is necessary to recognize that the communication apparatus 151 belongs to the network to which the terminal apparatus 101 belongs, the network being created by the AP 131. Specifically, the terminal apparatus 101 broadcasts a search signal on the network to which the terminal apparatus 101 belongs via the AP 131 to check communication with the communication apparatus 151.

According to the present embodiment, a state where the terminal apparatus 101 and the communication apparatus 151 are merely connected to the same AP is regarded as an infrastructure connection state. That is, in the infrastructure connection state, it is not necessary to recognize that a partner apparatus belongs to the network to which the terminal apparatus 101 or the communication apparatus 151 belongs provided that the terminal apparatus 101 and the communication apparatus 151 are connected to the same AP.

Connection Setting Process

According to the present embodiment, the terminal apparatus 101 applies settings (connection settings) for operation of the communication apparatus 151 in at least one communication mode of the infrastructure mode and the P2P mode by using wireless communication with the communication apparatus 151. According to the present embodiment, a connection setting process is performed by wireless communication and also referred to as a cableless setup (CLS).

The communication apparatus 151 performs the connection setting process in the connection setting mode, which is a mode in which the connection setting process is performed. The connection setting mode will be described in detail later.

The terminal apparatus 101 performs the connection setting process while a predetermined application that is stored in, for example, the ROM 104 or the external storage 106 is running. The predetermined application is used to set the access point to which the communication apparatus 151 is to be connected or to cause the communication apparatus 151 to print, for example, image data or document data in the terminal apparatus 101. The predetermined application is referred to below as a connection setting application. The connection setting application may have another function other than the function of setting the access point to which the communication apparatus 151 is to be connected and the print function. For example, when the communication apparatus 151 has a scan function, the connection setting application may have a function of scanning a manuscript that is set in the communication apparatus 151, a function of applying other settings of the communication apparatus 151, and a function of checking the state of the communication apparatus 151.

When the AP 131 and the communication apparatus 151 are connected to each other and the communication apparatus 151 operates in the infrastructure mode, the terminal apparatus 101 wirelessly transmits an infrastructure setting command for operation of the communication apparatus 151 in the infrastructure mode to the communication apparatus 151. Examples of the infrastructure setting command include information about the AP 131. Examples of the information about the AP 131 include the SSID (Service Set identifier) of the AP 131 and the password for connection with the AP 131.

When the communication apparatus 151 operates in the P2P mode, the terminal apparatus 101 wirelessly transmits a P2P setting command for operation of the communication apparatus 151 in the P2P mode to the communication apparatus 151. The terminal apparatus 101 obtains information for P2P connection with the communication apparatus 151 from the communication apparatus 151. Examples of the information for P2P connection with the communication apparatus 151 include the SSID of the communication apparatus 151 and the password for connection with the communication apparatus 151. When the P2P setting command is received, the communication apparatus 151 may activate a WFD function to operate as the group owner or may activate the access point in the communication apparatus 151.

According to the present embodiment, P2P connection for connection setting between the terminal apparatus 101 and the communication apparatus 151 is used to transmit the infrastructure setting command and the P2P setting command in the connection setting process and to obtain the information for P2P connection with the communication apparatus 151. According to the present embodiment, the P2P connection for connection setting is divided into two kinds of connection of Wi-Fi connection (connection that is made by the communication unit 109 and the communication unit 156) and BLE connection (connection that is made by the near field communication unit 110 and the near field communication unit 157).

For this reason, two processes of a connection setting process with Wi-Fi connection and a connection setting process with BLE connection will now be described.

A communication method other than Wi-Fi and BLE such as Classic Bluetooth may be used for the P2P connection for connection setting.

After Wi-Fi infrastructure connection or P2P connection is established between the terminal apparatus 101 and the communication apparatus 151 in the connection setting process, the terminal apparatus 101 and the communication apparatus 151 can have communication therebetween through the established connection. Specifically; for example, the terminal apparatus 101 can transmit a print job to cause the communication apparatus 151 to print and a scan job to cause the communication apparatus 151 to scan to the communication apparatus 151 through the established connection.

Connection Setting Mode

The communication apparatus 151 can operate in the connection setting mode as described above. For example, start of operation of the communication apparatus 151 in the connection setting mode may be triggered by pressing a connection setting mode button by the user or starting up (switching on) the communication apparatus 151 for the first time after arrival of the communication apparatus 151. The connection setting mode button may be a hardware button of the communication apparatus 151 or a software button that is displayed on the display unit 161 by the communication apparatus 151.

When the communication apparatus 151 starts operating in the connection setting mode, the communication apparatus 151 activates Wi-Fi communication and BLE communication. Specifically, the communication apparatus 151 activates the AP (connection setting AP) that is exclusive to the connection setting mode in the communication apparatus 151 to activate the Wi-Fi communication. In this state, the communication apparatus 151 can establish Wi-Fi P2P connection with the terminal apparatus 101. The connection information (the SSID and the password) for connection with the connection setting AP is held in advance by the connection setting application that is installed in the terminal apparatus 101. The terminal apparatus 101 holds the connection information for connection with the connection setting AP in advance. Accordingly, the connection information for connection with the connection setting AP, which differs from the connection information about the AP that is activated in the P2P mode, cannot be freely changed by the user. In the connection setting mode, the communication apparatus 151 may be connected to the terminal apparatus 101 by Wi-Fi Direct (WFD) instead of normal Wi-Fi. That is, the communication apparatus 151 may operate as the group owner and may receive a setting command from the terminal apparatus 101 by WFD communication.

The communication apparatus 151 starts transmitting the advertisement information to activate the BLE communication. In this state, the communication apparatus 151 can establish BLE connection with the terminal apparatus 101. According to the present embodiment, the communication apparatus 151 can receive a BLE pairing request when a predetermined period has passed after the BLE communication is activated. When the BLE pairing request is received during the predetermined period, the communication apparatus 151 is paired with an apparatus that transmits the pairing request and establishes BLE connection. When the BLE pairing request is not received during the predetermined period, the communication apparatus 151 may inactivate the BLE communication.

After the Wi-Fi communication and the BLE communication are activated in the connection setting mode, the communication apparatus 151 receives the setting command through each communication and performs a process in accordance with the received setting command.

Figure 6A:
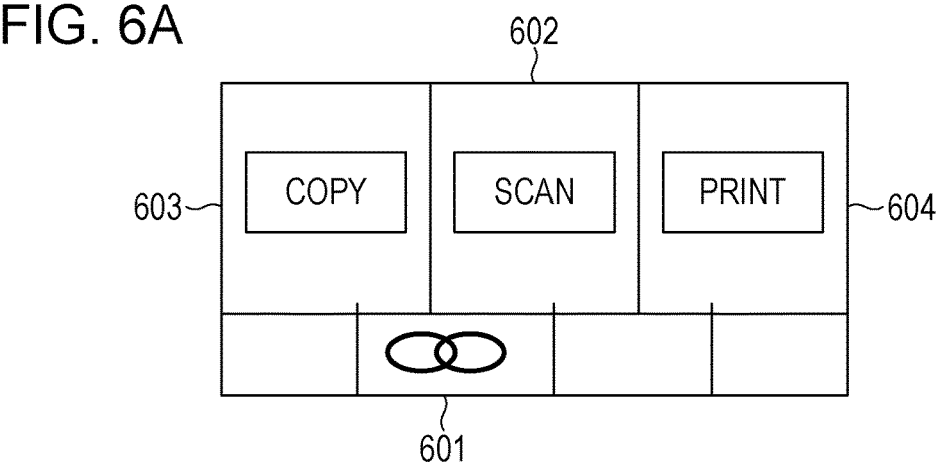
FIGS. 6A to 6D illustrate examples of a screen that is displayed by the communication apparatus according to the embodiment of the present invention.

FIG. 6A illustrates a home screen that is displayed by the communication apparatus 151. The home screen includes a connection setting mode button 601, a button 602 for causing the communication apparatus 151 to perform a scan process, a button 603 for causing the communication apparatus 151 to perform a copy process, and a button 604 for causing the communication apparatus 151 to perform a print process.

Figure 6B:
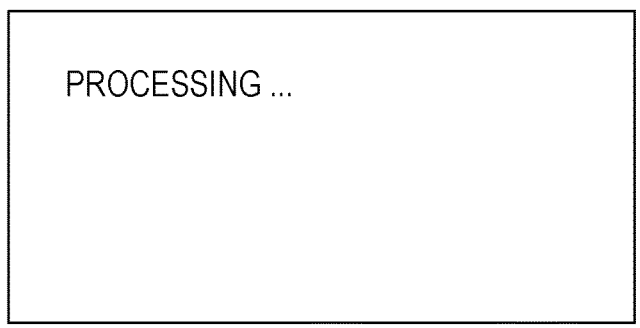

FIG. 6B illustrates a screen for notifying the user of start of operation of the communication apparatus 151 in the connection setting mode. This screen is displayed on the display unit 161 by pressing the connection setting mode button 601 with the communication apparatus 151 starting operating in the connection setting mode. In a state where the screen is displayed, the communication apparatus 151 activates the Wi-Fi communication and activates the BLE communication.

Figure 6C:
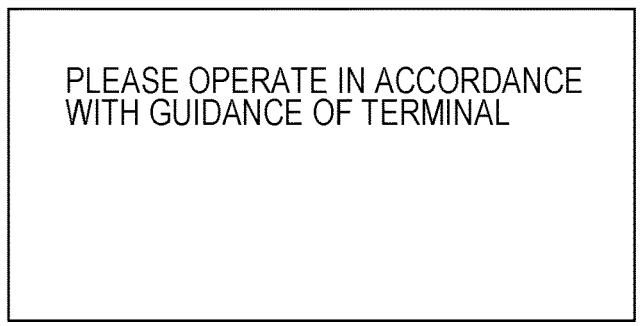

FIG. 6C illustrates a screen for notifying the user that the communication apparatus 151 starts operating in the connection setting mode, and that operation of the terminal apparatus 101 is needed. This screen is displayed on the display unit 161 after the activation of the Wi-Fi communication is finished or the activation of the BLE communication is finished.

Figure 6D:
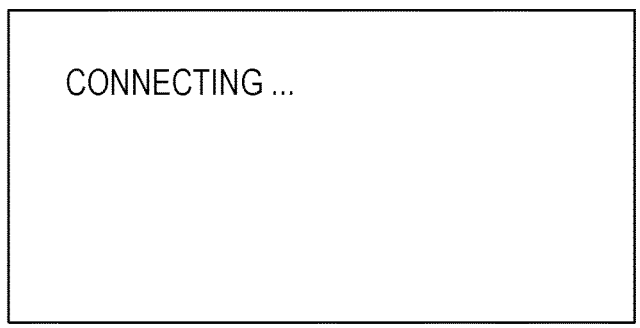

FIG. 6D illustrates a screen that is displayed with the communication apparatus 151 performing a process in accordance with the setting command that is received.

Connection Setting Process with Wi-Fi

Figure 4:
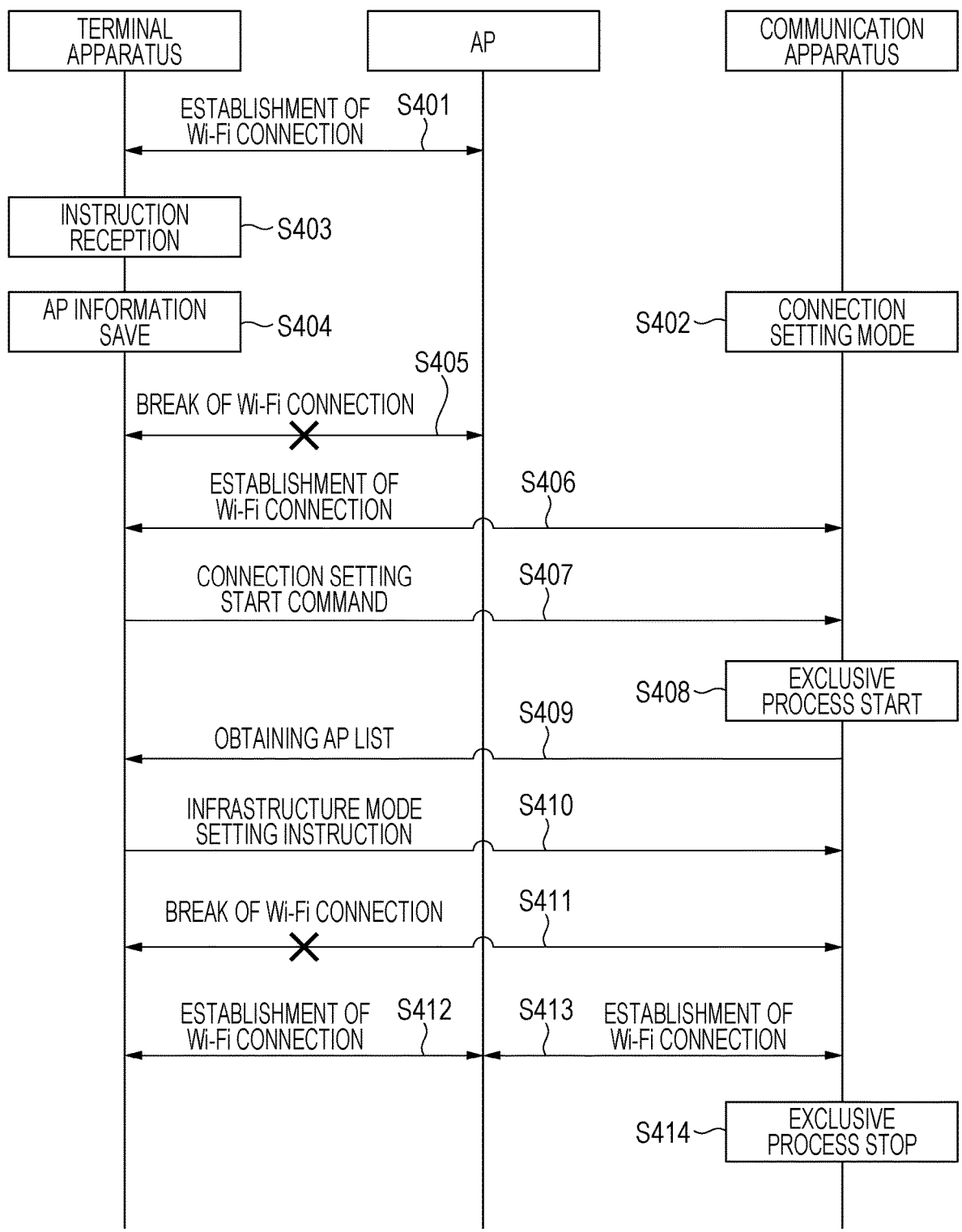
FIG. 4 illustrates an example of a sequence diagram of a connection setting process that is performed by a communication system according to the embodiment of the present invention.

FIG. 4 is a sequence diagram of processes that are performed by the apparatuses in the connection setting process with Wi-Fi. The processes illustrated in the sequence diagram in FIG. 4 are performed, for example, by reading programs that are stored in a memory of each apparatus by the CPU of the apparatus to the RAM of the apparatus and executing the programs.

At S401, the terminal apparatus 101 is connected to the AP 131 by Wi-Fi.

Subsequently, at S402, the communication apparatus 151 starts operating in the connection setting mode. In the connection setting mode, the connection settings of the communication apparatus 151 are applied.

When the communication apparatus 151 starts operating in the connection setting mode, the communication apparatus 151 activates the AP (connection setting AP) that is exclusive to the connection setting mode in the communication apparatus 151. In this state, the communication apparatus 151 can establish Wi-Fi P2P connection with the terminal apparatus 101. The connection information (the SSID and the password) for connection with the connection setting AP is held in advance by the connection setting application that is installed in the terminal apparatus 101. The terminal apparatus 101 holds the connection information for connection with the connection setting AP in advance. Accordingly, the connection information for connection with the connection setting AP, which differs from the connection information of the AP that is activated in the P2P mode, cannot be freely changed by the user.

When the communication apparatus 151 starts operating in the connection setting mode, the communication apparatus 151 further activates the BLE function and starts transmitting the advertisement information. In this state, the communication apparatus 151 can establish BLE connection with the terminal apparatus 101.

Subsequently, at S403, the terminal apparatus 101 receives an instruction for performing the connection setting process from the user by using a screen that is displayed on the display unit 108 by the connection setting application.

Subsequently, at S404, the terminal apparatus 101 saves information about the AP (AP 131) connected when the instruction for performing the connection setting process is received in the memory. Examples of the information about the AP 131 include the connection information (the SSID and the password) for connection with the AP 131 and information about the frequency and channel that are used for the connection with the AP 131.

Subsequently, at S405, the terminal apparatus 101 disconnects the Wi-Fi connection with the AP 131.

Subsequently, at S406, the terminal apparatus 101 establishes connection with the connection setting AP in the communication apparatus 151 by using connection information for connection with the connection setting AP that is obtained in advance. Consequently, the terminal apparatus 101 temporarily establishes Wi-Fi P2P connection with the communication apparatus 151.

Subsequently, at S407, the terminal apparatus 101 transmits a start command of the connection setting process to the communication apparatus 151 through the Wi-Fi connection. An AP list described later is received after the start command of the connection setting process is transmitted, and the start command of the connection setting process can be regarded as a request command of the AP list.

It is assumed that when the start command of the connection setting process is received by the communication apparatus 151, the communication apparatus 151 has not started a Wi-Fi exclusive process. In this case, at S408, the communication apparatus 151 starts the BLE exclusive process. Specifically, the communication apparatus 151 performs a process, as the BLE exclusive process, of preventing the connection setting process with BLE. As well, the communication apparatus 151 is allowed to perform the connection setting process with Wi-Fi while the communication apparatus 151 is performing the BLE exclusive process.

Since the communication apparatus 151 also activates the BLE function in the connection setting mode, the communication apparatus 151 can simultaneously establish and maintain the BLE connection and the Wi-Fi connection with another apparatus. Accordingly, there is a possibility that the communication apparatus 151 receives the setting command and the start command of the connection setting process through the BLE connection after the start command of the connection setting process is received through the Wi-Fi connection. In present invention even when the communication apparatus 151 receives the setting command and the start command of the connection setting process through the BLE connection, the communication apparatus 151 performs no processes based on the commands by execution of the BLE exclusive process. That is, even when the communication apparatus 151 receives the commands by BLE, the communication apparatus 151 neither transmits the AP list nor is connected to the access point in accordance with the setting command in a state (exclusive state) where the BLE exclusive process is being performed. Alternatively, for example, the communication apparatus 151 may transmit, by BLE, error information (notification information) that represents that the connection setting process is being performed by Wi-Fi to an apparatus that transmits each command. This enables the communication apparatus 151 to accept the connection setting process preferentially from the apparatus that transmits the start command earlier than the others.

Subsequently, at S409, the communication apparatus 151 searches access points to which the communication apparatus 151 can be connected by Wi-Fi. The communication apparatus 151 transmits through the WiFi P2P connection a search result, that is, the list (AP list) of the access points to which the communication apparatus 151 can be connected by Wi-Fi to the terminal apparatus 101. That is, the terminal apparatus 101 obtains the AP list through the Wi-Fi P2P connection. The timing with which the access points are searched is not limited thereto and may be, for example, right after the operation in the connection setting mode is started.

Subsequently, at S410, the terminal apparatus 101 transmits the infrastructure setting command to the communication apparatus 151 through the Wi-Fi P2P connection. The infrastructure setting command includes the access point to which the communication apparatus 151 is to be connected and the connection information for connection. For example, when the AP list includes the information about the AP 131 that is saved in the memory at S404, the access point to which the communication apparatus 151 is to be connected is the AP 131, the information about which is saved in the memory at S404. For example, when the AP list does not include the information about the AP 131 that is saved in the memory at S404, the access point to which the communication apparatus 151 is to be connected is an access point that is selected from the AP list by the user. In the following description, the access point to which the communication apparatus 151 is to be connected is the AP 131, the information about which is saved in the memory at S404. At this time, the terminal apparatus 101 may receive an input of additional connection information (such as the password) for connection with the AP 131 from the user and may also transmit the additional connection information as the infrastructure setting command to the communication apparatus 151.

Subsequently, at S411, the terminal apparatus 101 disconnects the Wi-Fi P2P connection with the communication apparatus 151.

Subsequently, at S412, the terminal apparatus 101 is connected to the AP 131 by Wi-Fi again by using the connection information for connection with the AP 131, the information about which is saved in the memory at S404.

Subsequently, at S413, the communication apparatus 151 is connected to the AP 131 by Wi-Fi by using the connection information for connection with the AP 131 that is received at S410 in accordance with the infrastructure setting command. Consequently, infrastructure connection is established between the terminal apparatus 101 and the communication apparatus 151 with the AP 131 interposed therebetween. It is assumed that the communication apparatus 151 is connected to the terminal apparatus 101 by Wi-Fi and connected to a terminal apparatus other than the terminal apparatus 101 by BLE. It is assumed that, in this state, the start command of the connection setting process is received at S407. Subsequently, even when the communication apparatus 151 is connected to the AP 131 by Wi-Fi at S413, BLE connection between the communication apparatus 151 and the terminal apparatus other than the terminal apparatus 101 is maintained. The communication apparatus 151 can perform a process (for example, a process of communicating information about the state of the communication apparatus 151) other than the connection setting by BLE. Since the BLE connection is maintained, a state where the process can be performed is also maintained.

Subsequently, at S414, the communication apparatus 151 stops the BLE exclusive process. Accordingly, the connection setting process that is thereafter performed by BLE reflects settings on the communication apparatus 151. This is the end of the connection setting process.

Connection Setting Process with BLE

FIG. 5 is a sequence diagram of processes that are performed by the apparatuses in the connection setting process with BLE. The processes illustrated in the sequence diagram in FIG. 5 are performed, for example, by reading programs that are stored in the memory of each apparatus by the CPU of the apparatus to the RAM of the apparatus and executing the programs.

At S501, the terminal apparatus 101 is connected to the AP 131 by Wi-Fi.

Subsequently, at S502, the communication apparatus 151 starts operating in the connection setting mode. The BLE function is activated. Transmission of the advertisement information is started. In this state, the communication apparatus 151 can establish BLE connection with the terminal apparatus 101.

When the communication apparatus 151 starts operating in the connection setting mode, the communication apparatus 151 also activates a Wi-Fi function. The detail of the activation of the Wi-Fi function is the same as described above.

Subsequently, at S503, the terminal apparatus 101 receives an instruction for performing the connection setting process from the user by using a screen that is displayed on the display unit 108 by the connection setting application.

At S504, the terminal apparatus 101 establishes BLE P2P connection with the communication apparatus 151 in response to the advertisement information that is received from the communication apparatus 151. Subsequently, the terminal apparatus 101 is paired with the communication apparatus 151 by BLE. Specifically, the terminal apparatus 101 exchanges authentication information with the communication apparatus 151. The terminal apparatus 101 thereafter uses the exchanged authentication information for BLE communication when being needed to be paired. In the case where the terminal apparatus 101 has been paired (has exchanged the authentication information) with the communication apparatus 151, the terminal apparatus 101 may not be paired at this time, Subsequently, at S505, the terminal apparatus 101 transmits the start command of the connection setting process to the communication apparatus 151 through the BLE connection.

It is assumed that when the start command of the connection setting process is received, the communication apparatus 151 has not started the BLE exclusive process. In this case, at S506, the communication apparatus 151 starts the Wi-Fi exclusive process. Specifically, the communication apparatus 151 performs a process, as the Wi-Fi exclusive process, of preventing the connection setting process with Wi-Fi. As well, the communication apparatus 151 is allowed to perform the connection setting process with Wi-Fi during the communication apparatus 151 is performing the BLE exclusive process.

Since the communication apparatus 151 also activates the Wi-Fi function in the connection setting mode, the communication apparatus 151 can simultaneously establish and maintain the BLE connection and the Wi-Fi connection with another apparatus. Accordingly, there is a possibility that the communication apparatus 151 receives the setting command and the start command of the connection setting process through the Wi-Fi connection after the start command of the connection setting process is received through the BLE connection. In present invention even when the communication apparatus 151 receives the setting command and the start command of the connection setting process through the Wi-Fi connection, the communication apparatus 151 performs no processes based on the commands by execution the Wi-Fi exclusive process. That is, even when the communication apparatus 151 receives the commands by the communication apparatus 151 neither transmits the AP list nor is connected to the access point in accordance with the setting command in a state (exclusive state) where the Wi-Fi exclusive process is being performed. Alternatively, for example, the communication apparatus 151 may transmit, by Wi-Fi, error information. that represents that the connection setting process is being performed by BLE to an apparatus that transmits each command. This enables the communication apparatus 151 to accept the connection setting process preferentially from the apparatus that transmits the start command earlier than the others.

Subsequently, at S507, the communication apparatus 151 searches access points to which the communication apparatus 151 can be connected by Wi-Fi. The communication apparatus 151 transmits a search result, that is, the list (AP list) of the access points to which the communication apparatus 151 can be connected by Wi-Fi to the terminal apparatus 101 through the BLE connection. That is, the terminal apparatus 101 obtains the AP list through the BLE connection. The timing with which the access points are searched is not limited thereto and may be, for example, right after the operation in the connection setting mode is started.

Subsequently, at S508, the terminal apparatus 101 transmits the infrastructure setting command to the communication apparatus 151 through the BLE connection. The infrastructure setting command includes the access point to which the communication apparatus 151 is to be connected and the connection information for connection. For example, when the AP list includes the information about the AP 131 with which the terminal apparatus 101 is in connection, the access point to which the communication apparatus 151 is to be connected is the AP 131 with which the terminal apparatus 101 is in connection. For example, when the AP list does not include the information about the AP 131 with which the terminal apparatus 101 is in connection, the access point to which the communication apparatus 151 is to be connected is an access point that is selected from the AP list by the user. In the following description, the access point to which the communication apparatus 151 is to be connected is the AP 131 with which the terminal apparatus 101 is in connection. At this time, the terminal apparatus 101 may receive an input of additional connection information (such as the password) for connection with the AP 131 from the user and may also transmit the additional connection information as the infrastructure setting command to the communication apparatus 151.

Subsequently, at S509, the communication apparatus 151 is connected to the AP 131 by Wi-Fi by using the connection information for connection with the AP 131 that is received at S507 in accordance with the infrastructure setting command. Consequently, infrastructure connection is established between the terminal apparatus 101 and the communication apparatus 151 with the AP 131 interposed therebetween. This is the end of the connection setting process.

Subsequently, at S510, the communication apparatus 151 stops the Wi-Fi exclusive process. Accordingly, the connection setting process that is thereafter performed by Wi-Fi reflects settings on the communication apparatus 151.

The BLE communication function by the communication apparatus 151 remains activated also after the connection setting process by BLE is thus finished. That is, the terminal apparatus 101 and the communication apparatus 151 are in BLE connection with each other. The reason is that the terminal apparatus 101 and the communication apparatus 151 can perform a process (for example, a process of communicating information about the state of the communication apparatus 151) other than the connection setting by BLE.

Figure 7:
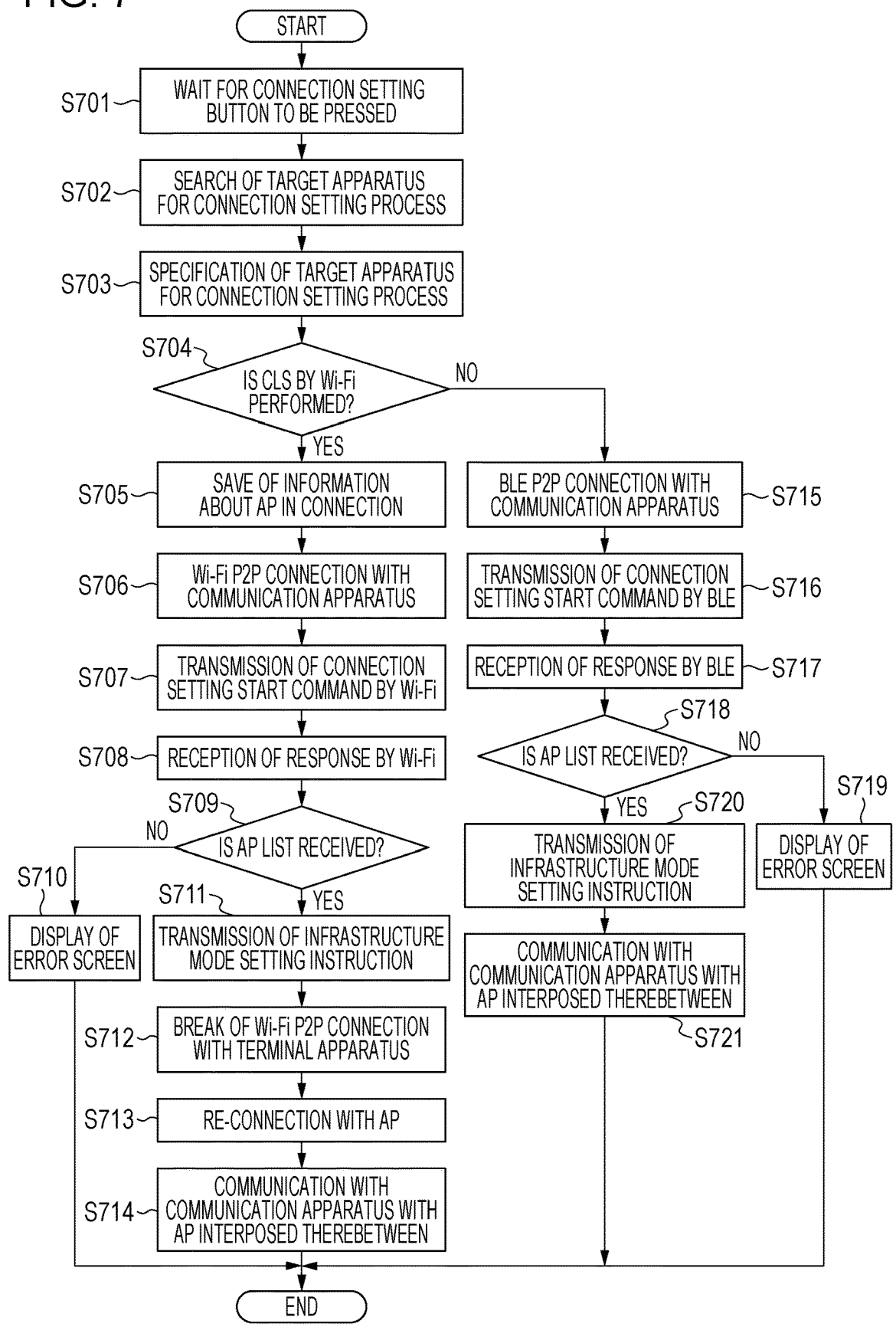
FIG. 7 is a flowchart illustrating a connection setting process that is performed by the terminal apparatus according to the embodiment of the present invention.

FIG. 7 is a flowchart illustrating the CLS that is performed by the terminal apparatus 101. Each process illustrated in the flowchart is performed, for example, by reading a program (such as the connection setting application) that is stored in the memory such as the ROM 104 by the CPU 103 to the RAM 105. The process illustrated in the flowchart is started with the terminal apparatus 101 connected to the AP 131 by Wi-Fi. The process illustrated in the flowchart is performed while the connection setting application is running on the terminal apparatus 101 and the terminal apparatus 101 is in connection with the AP 131 by Wi-Fi. The Wi-Fi connection between the terminal apparatus 101 and the AP 131 may be established while the connection setting application is not running on the terminal apparatus 101.

At S701, the terminal apparatus 101 waits until the user presses a connection setting button that is displayed by the connection setting application. This process corresponds to the processes at S403 and S503.

At S702, the terminal apparatus 101 searches apparatuses that can be targets for the connection setting process. Specifically, the CPU 103 searches a Wi-Fi beacon and a BLE advertisement signal that are sent form apparatuses that operate in the connection setting mode. The CPU 103 causes a list of the apparatuses that can be the targets for the connection setting process to be displayed in response to the received beacon and advertisement information. In some cases, one of the apparatuses that operate in the connection setting mode has already activated the Wi-Fi function and the BLE function as in the communication apparatus 151 described above. In these cases, the communication apparatus 151 is displayed on the list due to the Wi-Fi beacon, and the communication apparatus 151 is displayed on the list due to the BLE beacon.

At S703, the terminal apparatus 101 receives a selection from the list by the user and specifies the apparatus that can be the target for the connection setting process from the list. Here, the apparatus that can be the target for the connection setting process is the communication apparatus 151. When the user selects the communication apparatus 151 that is displayed due to the Wi-Fi beacon, the connection setting process by Wi-Fi is performed. When the user selects the communication apparatus 151 that is displayed due to the BLE advertisement signal, the connection setting process by BLE is performed.

At S704, the terminal apparatus 101 determines whether the connection setting process by Wi-Fi is to be performed. That is, the terminal apparatus 101 determines whether the communication apparatus 151 that is displayed due to the Wi-Fi beacon is selected and whether the communication apparatus 151 that is displayed due to the BLE advertisement signal is selected. In the case where the terminal apparatus 101 performs the connection setting process by the flow proceeds to S705. In the case where the terminal apparatus 101 performs the connection setting process by BLE, the flow proceeds to S715.

Processes after it is determined at S704 that the connection setting process by Wi-Fi is to be performed will now be described. At S705, the terminal apparatus 101 saves connection information for connection with the AP 131 to which the terminal apparatus 101 is connected by Wi-Fi in the memory. This process corresponds to the process at S404.

At S706, the terminal apparatus 101 disconnects the Wi-Fi connection with the AP 131 and establishes Wi-Fi P2P connection with the communication apparatus 151. This process corresponds to the processes at S405 and S406.

At S707, the terminal apparatus 101 transmits the start command of the connection setting process to the communication apparatus 151 through the Wi-Fi connection. This process corresponds to the process at S407.

At S708, the terminal apparatus 101 receives a response against the start command of the connection setting process from the communication apparatus 151 through the Wi-Fi connection.

At S709, the terminal apparatus 101 determines whether the response that is received at S708 is the AP list. In the case where the response that is received by the terminal apparatus 101 at S708 is the AP list, the flow proceeds to S711. In the case where the response that is received at S708 is not the AP list (the response that is received at S708 is error information), the flow proceeds to S710.

At S710, the terminal apparatus 101 causes the display unit 108 to display a screen that represents that the communication apparatus 151 is performing the connection setting process by BLE on the basis of the received error information. Subsequently, the terminal apparatus 101 finishes the connection setting process.

At S711, the terminal apparatus 101 transmits the infrastructure setting command to the communication apparatus 151 through the Wi-Fi connection. This process corresponds to the process at S410.

At S712, the terminal apparatus 101 disconnects the Wi-Fi P2P connection with the communication apparatus 151. This process corresponds to the process at S411.

At S713, the terminal apparatus 101 is connected to the AP 131 by Wi-Fi again by using the connection information for connection with the AP 131, the information about which is saved in the memory at S705. This process corresponds to the process at S412.

At S714, the terminal apparatus 101 communicates with the communication apparatus 151 with the AP 131 interposed therebetween and obtains, for example, capability of the communication apparatus 151. Consequently, the terminal apparatus 101 registers the communication apparatus 151 as an apparatus with which the terminal apparatus 101 is thereafter to communicate.

Processes after it is determined at S704 that the connection setting process by BLE is to be performed will now be described. At S715, the terminal apparatus 101 establishes BLE P2P connection with the communication apparatus 151. This process corresponds to the process at S504.

At S716, the terminal apparatus 101 transmits the start command of the connection setting process to the communication apparatus 151 through the BLE connection. This process corresponds to the process at S505.

At S717, the terminal apparatus 101 receives a response against the start command of the connection setting process from the communication apparatus 151 through the BLE connection.

At S718, the terminal apparatus 101 determines whether the response that is received at S717 is the AP list. In the case where the response that is received by the terminal apparatus 101 at S717 is the AP list, the flow proceeds to S720. In the case where the response that is received at S717 is not the AP list (the response that is received. at S717 is error information), the flow proceeds to S719.

At S719, the terminal apparatus 101 causes the display unit 108 to display a screen that represents that the communication apparatus 151 is performing the connection setting process by Wi-Fi on the basis of the received error information. Subsequently, the terminal apparatus 101 finishes the connection setting process.

At S720, the terminal apparatus 101 transmits the infrastructure setting command to the communication apparatus 151 through the BLE connection. This process corresponds to the process at S508.

At S721, the terminal apparatus 101 communicates with the communication apparatus 151 with the AP 131 interposed therebetween and obtains, for example, the capability of the communication apparatus 151. Consequently, the terminal apparatus 101 registers the communication apparatus 151 as an apparatus with which the terminal apparatus 101 is thereafter to communicate.

The terminal apparatus 101 can thus perform the connection setting process against the communication apparatus 151. In the case where the connection setting process is being performed by another apparatus in a communication method that differs from the communication method that is used by the terminal apparatus 101, the user can be notified that the connection setting process cannot be performed by the terminal apparatus 101.

FIG. 8 is a flowchart illustrating the connection setting process that is performed by the communication apparatus 151. Each process illustrated in the flowchart is performed, for example, by reading a program that is stored in the memory such as the ROM 152 by the CPU 154 to the RAM 153.

At S801, the communication apparatus 151 starts operating in the connection setting mode. This process corresponds to the processes at S402 and S502.

Subsequently, at S802, the communication apparatus 151 searches access points to which the communication apparatus 151 can be connected by Wi-Fi and creates the AP list.

Subsequently, at S803, the communication apparatus 151 determines whether the CLS by Wi-Fi is to be performed. Specifically, for example, the communication apparatus 151 determines whether the connection request by Wi-Fi is received from the terminal apparatus 101 and whether the connection request by BLE is received from the terminal apparatus 101. In the case where the communication apparatus 151 receives the connection request by Wi-Fi from the terminal apparatus 101, and the result of the determination is YES, the flow proceeds to S804, and the connection setting process by Wi-Fi is performed. In the case where the communication apparatus 151 receives the connection request by BLE from the terminal apparatus 101, and the result of the determination is NO, the flow proceeds to S814, and the connection setting process by BLE is performed.

Processes after it is determined at S803 that the connection setting process by Wi-Fi is to be performed will now be described. At S804, the communication apparatus 151 is P2P-connected to the terminal apparatus 101 by Wi-Fi based on that the connection request is received from the terminal apparatus 101 by Wi-Fi. This process corresponds to the process at S406.

Subsequently, at S805, the communication apparatus 151 receives the start command of the connection setting process from the terminal apparatus 101 by Wi-Fi. This process corresponds to the process at S407.

Subsequently, at S806, the communication apparatus 151 starts the BLE exclusive process. This process corresponds to the process at S408.

Subsequently, at S807, the communication apparatus 151 transmits the AP list that is created at S802 to the terminal apparatus 101 by Wi-Fi. This process corresponds to the process at S409.

Subsequently, at S808, the communication apparatus 151 receives the infrastructure setting command from another apparatus.

Subsequently, at S809, the communication apparatus 151 determines whether the infrastructure setting command is received by Wi-Fi. In the case where the communication apparatus 151 receives the infrastructure setting command by Wi-Fi, the flow proceeds to S811. In the case where the infrastructure setting command is not received by Wi-Fi (is received by BLE), the flow proceeds to S810.

At S810, the communication apparatus 151 transmits, by BLE, error information that represents that the connection setting process is being performed by Wi-Fi to an apparatus that transmits the infrastructure setting command. Subsequently, the communication apparatus 151 waits until the infrastructure setting command is received, and the flow returns to S808.

At S811, the communication apparatus 151 disconnects the Wi-Fi P2P connection with the terminal apparatus 101. This process corresponds to the process at S411.

Subsequently, at S812, the communication apparatus 151 is connected to the AP 131 in accordance with the infrastructure setting command. This process corresponds to the process at S413.

Subsequently, at S813, the communication apparatus 151 stops the BLE exclusive process. This process corresponds to the process at S414. Subsequently, the communication apparatus 151 finishes the connection setting process.

Processes after it is determined at S803 that the connection setting process by BLE is to be performed will now be described. At S814, the communication apparatus 151 is P2P-connected to the terminal apparatus 101 by BLE based on that the connection request is received from the terminal apparatus 101 by BLE. This process corresponds to the process at S504.

Subsequently, at S815, the communication apparatus 151 receives the start command of the connection setting process from the terminal apparatus 101 by BLE. This process corresponds to the process at S505.

Subsequently, at S816, the communication apparatus 151 starts the Wi-Fi exclusive process. This process corresponds to the process at S506.

Subsequently, at S817, the communication apparatus 151 transmits the AP list that is created at S802 to the terminal apparatus 101 by BLE.

Subsequently, at S818, the communication apparatus 151 receives the infrastructure setting command from another apparatus.

Subsequently, at S819, the communication apparatus 151 determines whether the infrastructure setting command is received by BLE. In the case where the communication apparatus 151 receives the infrastructure setting command by BLE, the flow proceeds to S821. In the case where the infrastructure setting command is not received by BLE (is received by Wi-Fi), the flow proceeds to S820.

At S820, the communication apparatus 151 transmits, by Wi-Fi, error information that represents that the connection setting process is being performed by BLE to an apparatus that transmits the infrastructure setting command. Subsequently, the communication apparatus 151 waits until the infrastructure setting command is received, and the flow returns to S818.

Subsequently, at S821, the communication apparatus 151 is connected to the AP 131 in accordance with the infrastructure setting command. This process corresponds to the process at S509.

Subsequently, at S822, the communication apparatus 151 stops the BLE exclusive process. This process corresponds to the process at S510. Subsequently, the communication apparatus 151 finishes the connection setting process.

The communication apparatus 151 can thus perform the connection setting process in response to the instruction from the terminal apparatus 101. In the case where the connection setting process is being performed in response to the instruction that is received from another apparatus in a communication method that differs from the communication method that is used by the communication apparatus 151, the user can be notified that the connection setting process cannot be performed by the terminal apparatus 101.

Patterns under exclusive control in the manner described above will be described.

For example, the communication apparatus 151 starts operating in the connection setting mode in response to an instruction from the user and activates the Wi-Fi function and the BLE function. Subsequently, a terminal apparatus A establishes Wi-Fi P2P connection with the communication apparatus 151, and a terminal apparatus B establishes BLE P2P connection with the communication apparatus 151. The terminal apparatus B transmits the infrastructure setting command to the communication apparatus 151 through the BLE connection earlier than the terminal apparatus A. In this case, the communication apparatus 151 applies neither the start command nor the setting command that is transmitted from the terminal apparatus A by Wi-Fi until the communication apparatus 151 starts the Wi-Fi exclusive process and finishes the connection setting process by BLE. In the case where the communication apparatus 151 receives the start command and the setting command from the terminal apparatus A by Wi-Fi while the Wi-Fi exclusive process is being performed, the communication apparatus 151 may transmit the error information to notify that the connection setting process is being performed to the terminal apparatus A as described above.

For example, the communication apparatus 151 starts operating in the connection setting mode in response to an instruction from the user and activates the Wi-Fi function and the BLE function. Subsequently, the terminal apparatus A establishes BLE P2P connection with the communication apparatus 151, and the terminal apparatus B establishes Wi-Fi P2P connection with the communication apparatus 151. The terminal apparatus B transmits the infrastructure setting command to the communication apparatus 151 through the Wi-Fi connection earlier than the terminal apparatus A. In this case, the communication apparatus 151 applies neither the start command nor the setting command that is transmitted from the terminal apparatus A by BLE until the communication apparatus 151 starts the BLE exclusive process and finishes the connection setting process by Wi-Fi. In the case where the communication apparatus 151 receives the start command and the setting command from the terminal apparatus A by BLE while the BLE exclusive process is being performed, the communication apparatus 151 may transmit the error information to notify that the connection setting process is being performed to the terminal apparatus A as described above.

According to the present embodiment, after transition to the connection setting mode in response to the instruction from the user as above, the communication apparatus 151 can activate the Wi-Fi function and the BLE function and perform the connection setting process by using the communication methods thereof. This allows the user to eliminate the need of separate operations against the communication apparatus 151 in the case where the connection setting process is performed by the Wi-Fi function and where the connection setting process is performed by the BLE function. The user can activate the Wi-Fi function and the BLE function of the communication apparatus 151 by one operation.

According to the present embodiment, the communication apparatus 151 performs the connection setting process by preferentially using the communication method that is used for communication of the start command that is received earlier after the Wi-Fi function and the BLE function are activated. That is, another communication method other than the communication method that is used for communication of the start command that is received earlier is excluded, and the connection setting process by the other communication method is not accepted. This enables the connection setting process that is performed earlier to be preferentially used.

Figure 2:
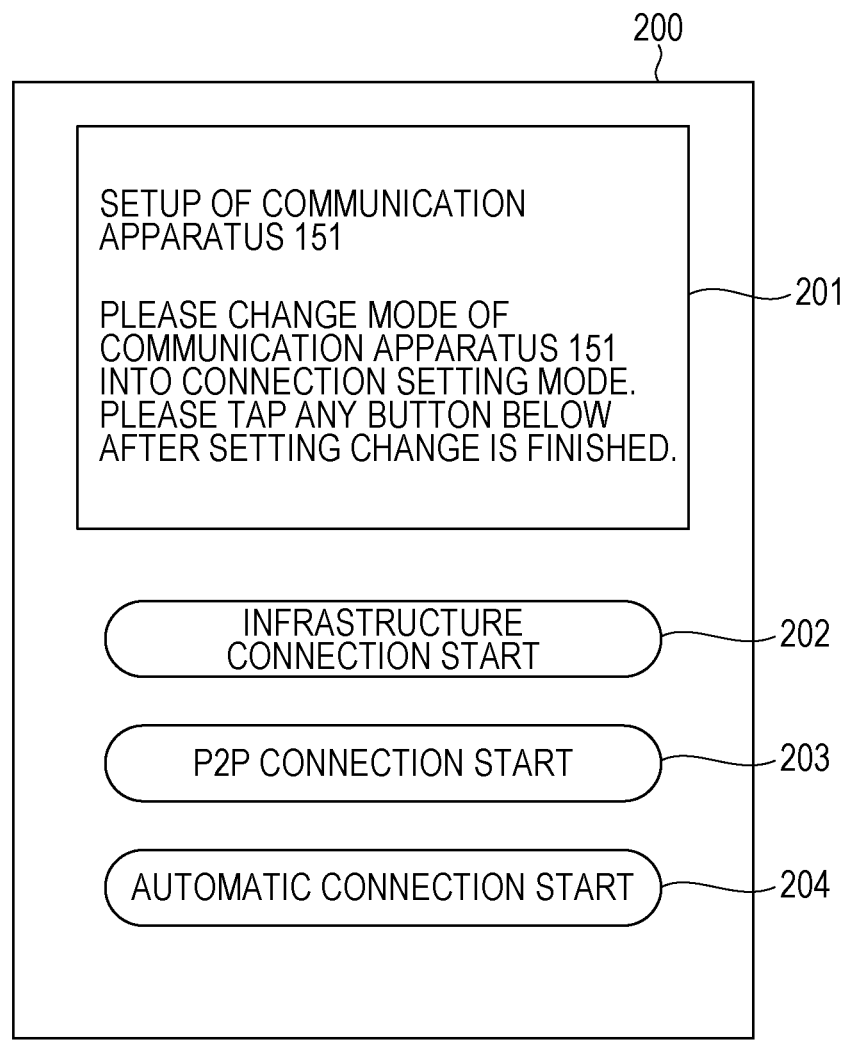
FIG. 2 illustrates an example of a setting screen that is displayed by a terminal apparatus according to the embodiment of the present invention.

In the above description, the connection setting process causes the communication apparatus 151 to operate in the infrastructure mode. However, this is not a limitation. The connection setting process may cause the communication apparatus 151 to operate in the P2P mode. For example, the terminal apparatus 101 causes the display unit to display a setting screen 200 illustrated in FIG. 2. In the case where the user selects an infrastructure connection start button 202, the terminal apparatus 101 transmits the infrastructure setting command to preferentially set the infrastructure mode of the communication apparatus 151. In the case where the user selects a P2P connection start button 203, the terminal apparatus 101 does not transmit the infrastructure setting command to the communication apparatus 151 but transmits a P2P mode setting instruction thereto. That is, the terminal apparatus 101 preferentially sets the P2P mode of the communication apparatus 151. The communication apparatus 151 that receives the P2P mode setting instruction is not connected to the AP 131 and operates in the P2P mode. In the case where the user selects an automatic connection start button 204, the terminal apparatus 101 performs the connection setting process to automatically select whether the communication apparatus 151 operates in the infrastructure mode and whether the communication apparatus 151 operates in the P2P mode. Specifically, in the case of connection with any AP by Wi-Fi, the terminal apparatus 101 determines that the communication apparatus 151 operates in the infrastructure mode and transmits the infrastructure setting command to the communication apparatus 151. In the case of non-connection with any AP by Wi-Fi, the terminal apparatus 101 determines that the communication apparatus 151 operates in the P2P mode and transmits the P2P mode setting instruction to the communication apparatus 151. For example, the setting screen 200 may include an area 201 for notifying the user of transition to the CLS mode of the communication apparatus 151.

In the above description, the communication apparatus 151 operates in the infrastructure mode by using the AP to which the terminal apparatus 101 is connected. However, this is not a limitation. For example, the communication apparatus 151 may operate in the infrastructure mode by using the AP to which the terminal apparatus 101 is not connected. For example, the terminal apparatus 101 causes the display unit 108 to display a list of APs to which the communication apparatus 151 can be connected. The list may be the list of APs that are searched by the terminal apparatus 101 by Wi-Fi or may be the list of APs that are searched by the communication apparatus 151 by Wi-Fi. In the latter case, the terminal apparatus 101 obtains information about the list of the APs that are searched by the communication apparatus 151 by Wi-Fi through the BLE connection with the communication apparatus 151. The terminal apparatus 101 receives a selection of the AP from the list and a user input of connection information (such as the password) for connection with the AP that is selected by the user and transmits the infrastructure setting command including the connection information to the communication apparatus 151. This enables the terminal apparatus 101 to cause the communication apparatus 151 to operate in the infrastructure mode by using the AP to which the terminal apparatus 101 is not connected. For example, when the terminal apparatus 101 is in connection with any AP, the communication apparatus 151 may be preferentially connected to the AP to which the terminal apparatus 101 is connected. When the terminal apparatus 101 is not in connection with any AP, the communication apparatus 151 may be preferentially connected to the AP that is selected from the list as above.

According to the above embodiment, the communication apparatus 151 does not receive the setting instruction by the communication method that is exclusive while the exclusive process is being performed. However, this is not a limitation. For example, the communication apparatus 151 may inactivate communication by the communication method that is exclusive while the exclusive process is being performed. That is, for example, the communication apparatus 151 may perform the Wi-Fi exclusive process by inactivating the connection setting AP and disconnecting Wi-Fi connection established with the connection setting AP interposed therebetween. For example, the communication apparatus 151 may perform the BLE exclusive process by inactivating the BLE function and disconnecting BLE connection. When the exclusive process is finished, a communication function that is inactivated may be automatically activated, and connection with the terminal apparatus may be automatically established again by the activated communication function. The Wi-Fi connection by the connection setting AP is used by only the connection setting process. The BLE connection can be used for purpose other than the connection setting process. Accordingly, for example, the communication apparatus 151 performs the Wi-Fi exclusive process by inactivating the connection setting AP. However, the BLE exclusive process may be performed by performing the exclusive process in the manner described according to the above embodiment without inactivating the BLE function.

According to the above embodiment, the communication apparatus 151 responds the error information against the start command of the connection setting process that is received by the communication method that is exclusive during the exclusive process. Accordingly, the infrastructure setting command is not transmitted to the communication apparatus 151 by the communication method that is exclusive during the exclusive process. That is, while the communication apparatus 151 is performing the exclusive process, the communication apparatus 151 does not receive the infrastructure setting command. However, this is not a limitation. For example, the communication apparatus 151 may not apply the infrastructure setting command even when the infrastructure setting command is received, provided that the infrastructure setting command is transmitted to the communication apparatus 151 also during the exclusive process. That is, while the communication apparatus 151 is performing the exclusive process, the communication apparatus 151 may not be connected to the access point in accordance with the received infrastructure setting command even when the communication apparatus 151 receives the infrastructure setting command.

According to the above embodiment, the trigger for performing the exclusive process is reception of the start command of the connection setting process. However, this is not a limitation. For example, the trigger for performing the exclusive process may be reception of the infrastructure setting command (connection information for connection with the AP). More specifically, in FIG. 4, the exclusive process at S408 starts between S407 and S409. However, the exclusive process at S408 may start between S410 and S411 based on that the infrastructure setting command is received by Wi-Fi at S410. In FIG. 5, the exclusive process at S506 starts between S505 and S507. However, the exclusive process at S506 may start between S508 and S509 based on that the infrastructure setting command is received by BLE at S508. In this case, the exclusive process is not performed until the infrastructure setting command is received. Accordingly, the AP list is obtained as the response against the start command of the connection setting process by Wi-Fi and BLE.

The above embodiment can also be carried out in a manner in which a system or the apparatus is provided with program for performing one or more functions according to the above embodiment via a network or a storage medium, and one or more processors of a computer of the system or the apparatus execute the program. The above embodiment can also be carried out by a circuit (for example, an ASIC) for performing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-143287 filed Jul. 31, 2018, which is hereby incorporated by reference herein in its entirety.

What is claimed is:

1. A communication apparatus comprising:
at least one processor configured to
control the communication apparatus to operate in a state that the communication apparatus simultaneously maintains a first connection with a first terminal apparatus by using a first communication method and a second connection with a second terminal apparatus by using a second communication method having a higher communication speed than that of the first communication method;
receive, through the first connection, connection information for connection with an external device that is external to the communication apparatus, the first terminal apparatus, and the second terminal apparatus;
receive, through the second connection, the connection information for connection with the external device;

establish, in a case that the connection information is received through the first connection, a connection between the communication apparatus and the external device corresponding to the connection information received through the first connection and configured to establish, in a case that the connection information is received through the second connection, a connection between the communication apparatus and the external device corresponding to the connection information received through the second connection; and control the communication apparatus to operate, based on that a predetermined command is received through the second connection, in a first exclusive state in which the communication apparatus does not receive the connection information through the first connection or a second exclusive state in which the communication apparatus is not connected to the external device corresponding to the connection information received through the first connection, wherein the first connection is maintained after the connection between the communication apparatus and the external device corresponding to the connection information received through the second connection is established based on that the connection information is received through the second connection in a state in which the first connection and the second connection are simultaneously maintained.

2. The communication apparatus according to claim 1, wherein the at least one processor configures the communication apparatus to operate in:

a first state in which neither of the first connection nor the second connection can be established, or a second state in which the first connection and the second connection can be established, and wherein the at least one processor configures communication apparatus is to operate in the second state in response to a predetermined user operation that is performed at a time when the communication apparatus is configured to operate in the first state.

3. The communication apparatus according to claim 2, wherein the predetermined user operation is a press on a predetermined button that is displayed on a display unit by the communication apparatus.

4. The communication apparatus according to claim 1, wherein the at least one processor further configures the communication apparatus to operate in the first exclusive state or the second exclusive state during a predetermined period after the connection information is received through the second connection.

5. The communication apparatus according to claim 4, wherein the at least one processor further configures the communication apparatus to operate in the first exclusive state or the second exclusive state from the connection information is received through the second connection until the connection, between the communication apparatus and the external device corresponding to the connection information received through the second connection, is established.

6. The communication apparatus according to claim 1, wherein the connection between the communication apparatus and the external device corresponding to the connection information is connection by the second communication method.

7. The communication apparatus according to claim 1, wherein the second connection is disconnected in a case that the connection between the communication apparatus and the external device corresponding to the connection information received through the second connection is established based on that the connection information is received through the second connection.

8. The communication apparatus according to claim 1, wherein the first connection is maintained after connection between the communication apparatus and the external device corresponding to the connection information received through the first connection is established based on that the connection information is received through the first connection.

9. The communication apparatus according to claim 1, wherein the at least one processor further configures the communication apparatus to transmit notification information related to a state of the communication apparatus to the first terminal apparatus in a case that the predetermined command is received through the first connection with the communication apparatus operating in the first exclusive state or the second exclusive state.

10. The communication apparatus according to claim 1, wherein the at least one processor further configures the communication apparatus to operate in at least one of a state in which the communication apparatus does not receive the connection information through the second connection and a state in which the communication apparatus is not connected to the external device corresponding to the connection information received through the second connection based on that a specific command is received through the first connection.

11. The communication apparatus according to claim 1, wherein the at least one processor further configures the communication apparatus to receive, through at least one of the first connection and the second connection, an instruction to transition to a state in which the communication apparatus is able to connect with another apparatus without the external device interposing therebetween, wherein the instruction is received from one of the first terminal apparatus or the second terminal apparatus, to which the communication apparatus is connected without the external device interposing therebetween.

12. The communication apparatus according to claim 1, wherein the predetermined command is at least one of a command that represents start of a process of setting a destination to which the communication apparatus is connected and a command that includes the connection information.

13. The communication apparatus according to claim 1, wherein the communication apparatus operates as a parent station that creates a network to establish the second connection.

14. The communication apparatus according to claim 1, wherein the second connection is established with a predetermined access point of the communication apparatus.

15. The communication apparatus according to claim 1, wherein the at least one processor further configures the communication apparatus to transmit information about a state of the communication apparatus through the first connection.

16. The communication apparatus according to claim 1, wherein the first communication method is Bluetooth Low Energy.

17. The communication apparatus according to claim 1, wherein the first communication method is Bluetooth Classic.

18. The communication apparatus according to claim 1, wherein the second communication method is Wi-Fi.

19. The communication apparatus according to claim 1, further comprising:
A printer that prints an image on a recording medium with a recording material.

20. A control method for a communication apparatus that operates in a state that the communication apparatus simultaneously maintains a first connection with a first terminal apparatus by using a first communication method and a second connection with a second terminal apparatus by using a second communication method having a higher communication speed than that of the first communication method, the method comprising:
receiving, through the first connection, connection information for connection with an external device external to the communication apparatus, the first terminal apparatus, and the second terminal apparatus;
receiving, through the second connection, the connection information for connection with the external device;
establishing, in a case that the connection information is received through the first connection, a connection between the communication apparatus and the external device corresponding to the connection information received through the first connection and of establishing, in a case that the connection information is received through the second connection, a connection between the communication apparatus and the external device corresponding to the connection information received through the second connection; and
causing the communication apparatus to operate, based on that a predetermined command is received through the second connection in a first exclusive state in which the communication apparatus does not receive the connection information through the first connection or a second exclusive state in which the communication apparatus is not connected to the external device corresponding to the connection information received through the first connection,
wherein the first connection is maintained after the connection between the communication apparatus and the external device corresponding to the connection information received through the second connection is established based on that the connection information is received through the second connection in a state in which the first connection and the second connection are simultaneously maintained.

* * * * *